M. BARBOUR.
Sweeper for Seeding-Machines.
No. 200,684. Patented Feb. 26, 1878.
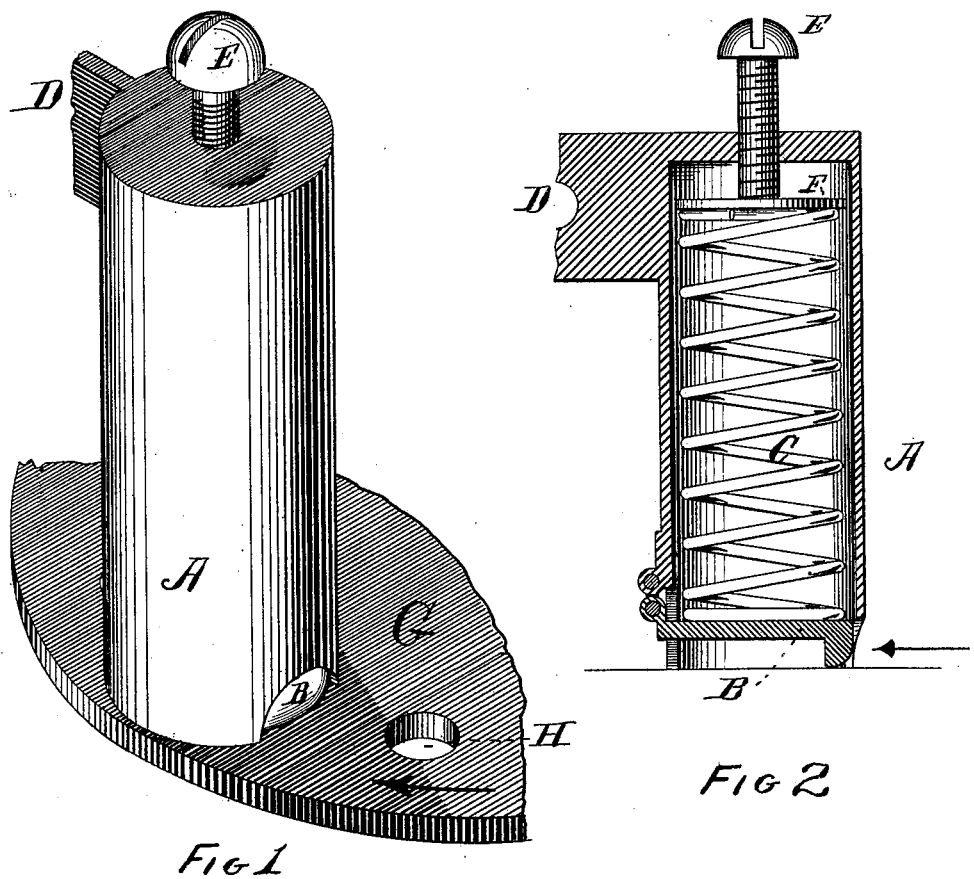
Witnesses
Robt. Chambers
W. H. Gray.
Matthew Barbour Inventor
Jas. W. See. Attorneys

UNITED STATES PATENT OFFICE.

MATTHEW BARBOUR, OF HAMILTON, OHIO.

IMPROVEMENT IN SWEEPERS FOR SEEDING-MACHINES.

Specification forming part of Letters Patent No. 200,684, dated February 26, 1878; application filed August 2, 1877.

*To all whom it may concern:*

Be it known that I, MATTHEW BARBOUR, of Hamilton, Butler county, Ohio, have invented a new and useful Improvement in Sweepers for Seeding-Machines, which improvement is fully set forth in the following specification and accompanying drawing, in which—

Figure 1 is a perspective view of my improved sweeper in position with reference to the charge-plate of a seeding-machine, and Fig. 2 a vertical section of the same.

Many seed-planting machines perform a part of their duty by means of a rotating charge-plate, which forms the bottom of the seed-box.

G, Fig. 1, shows a portion of such a plate. The plate has through it a circle of holes, H, only one of which is shown by the drawing. A stationary plate, lying under the plate G, forms a bottom for the holes H. The lower plate (not shown) has one hole in it, coincident with the circle of the holes H.

It will be seen that under the above circumstances all the holes H will be full of seed, and that as the plate G rotates each of the holes H will in turn be brought over the hole in the lower plate, thus removing the bottom of the holes H as they pass the opening in the lower plate, and allowing the seed to fall from the hole H, through the hole in the bottom plate, and into the furrow or conveying devices of the machine. Such an arrangement as described would not answer the purpose, for when any hole H coincides with the hole in the bottom plate, a continuous stream of seed would for the time being run from the box. This vitiating fault is remedied by making the holes H of such size as to hold as much seed as should be dropped at one time, and closing the top of a hole when the bottom is open, thus limiting the amount of seed dropped at once to the charge contained in a hole, H.

The usual method of closing the top of the coincident or acting hole has been to locate a bristle brush over the plate G, in contact with it at a point directly over the hole in the lower plate. The brush sweeps away the surplus seed and closes the top of the acting or coincident hole. It might appear that a stationary scraper would answer the purpose; but it would be found that with large seed, like corn, some grains would project above the upper surface of the charge-plate, and, catching upon the scraper, would clog the machine or be cut in two.

The brush or its substitute must be yielding enough to accommodate grains actually in the charge-holes, but projecting above the surface of the charge-plate, and rigid enough to bar the passage of grains not in the holes. The brush answers these purposes, but possesses three grave faults: It wears away rapidly, small seeds work up between the bristles and mat it, and its bristles sometimes pry seeds out of the charge-holes.

The object of my invention is to provide a substitute for the brush—one which will perform the brush's duties without possessing the brush's faults.

My invention consists, essentially, of a hinged lipped scraper rendered elastic by a spring.

The drawing needs but little explanation. A cylindrical case, A, takes the place of the brush, and is provided with an ear, D, which may be shaped in any suitable manner to adapt it to the usual brush-fastenings; or other attaching devices may be employed. The bottom of this case rests on or close to the surface of the charge-plate G, and is notched, as shown, to allow the passage of projecting grains. At the bottom of the case is hinged, as shown, the lipped scraper B, whose front is rounded or beveled under, so that projecting seeds will, on striking it, lift it out of the way. A spiral spring, C, adjustable in stiffness by means of the screw E, rests upon the scraper, and gives it elasticity in action.

It will be seen that the scraper B will bar the passage of any grains not in the charge-holes, and at the same time will yield enough to allow the passage of grains projecting upward from the charge-holes.

I claim as my invention—

A seeding-machine sweeper consisting of a beveled lipped hinged scraper, B, spring C, and cylindrical case A, all combined substantially as specified.

MATTHEW BARBOUR.

Witnesses:
G. W. ISENMINGER,
N. E. WARWICK.